United States Patent [19]

Breyer

[11] Patent Number: 5,038,835

[45] Date of Patent: Aug. 13, 1991

[54] APPARATUS FOR ISOLATING LOOM VIBRATIONS AND CONTINUOUSLY ADJUSTING ITS LEVEL

[75] Inventor: Werner Breyer, Lindau, Fed. Rep. of Germany

[73] Assignee: Lindauer Dornier Gesellschaft mbH, Lindau, Fed. Rep. of Germany

[21] Appl. No.: 464,178

[22] Filed: Jan. 12, 1990

[30] Foreign Application Priority Data

Jan. 12, 1989 [DE] Fed. Rep. of Germany ....... 8900312

[51] Int. Cl.$^5$ .......................... D03C 3/00; D03D 49/02
[52] U.S. Cl. ..................................... 139/1 R; 139/59; 248/550
[58] Field of Search .............. 248/550, 566, 562; 139/1 R, 59, 66 R, 85

[56] References Cited

U.S. PATENT DOCUMENTS

| | | | |
|---|---|---|---|
| 4,328,941 | 5/1982 | Phillips et al. | 248/550 |
| 4,664,156 | 5/1987 | Breyer . | |
| 4,699,180 | 10/1987 | Stefan et al. | 139/1 R |

FOREIGN PATENT DOCUMENTS

| | | |
|---|---|---|
| 0139773 | 5/1985 | European Pat. Off. . |
| 8502552 | 1/1985 | Fed. Rep. of Germany . |
| 3604991 | 8/1987 | Fed. Rep. of Germany . |
| 468491 | 3/1969 | Switzerland . |

*Primary Examiner*—Andrew M. Falik
*Attorney, Agent, or Firm*—W. G. Fasse; D. H. Kane, Jr.

[57] ABSTRACT

A loom, especially a loom equipped with a Jacquard mechanism is supported by a vibration isolating device. At least one, preferably two or four such devices are arranged in positions most effective for the vibration damping, with due regard to the center of gravity of the wrap beam and/or of the entire loom. At least one, preferably all vibration dampers are constructed to include a controllable level controlling element in the form of an air spring. The compression in the air spring is controlled in response to the spacing of a fixed point of the loom from the loom supporting surface. Thus, spacing variations between the loom and the Jacquard mechanism that could otherwise be caused due to weight changes of the loom, are eliminated or compensated, whereby the loom-Jacquard spacing is maintained constant.

8 Claims, 3 Drawing Sheets

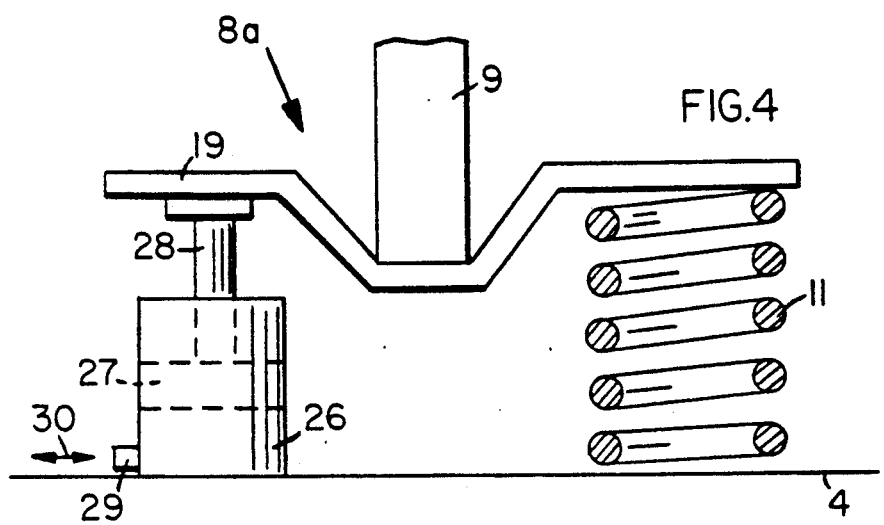
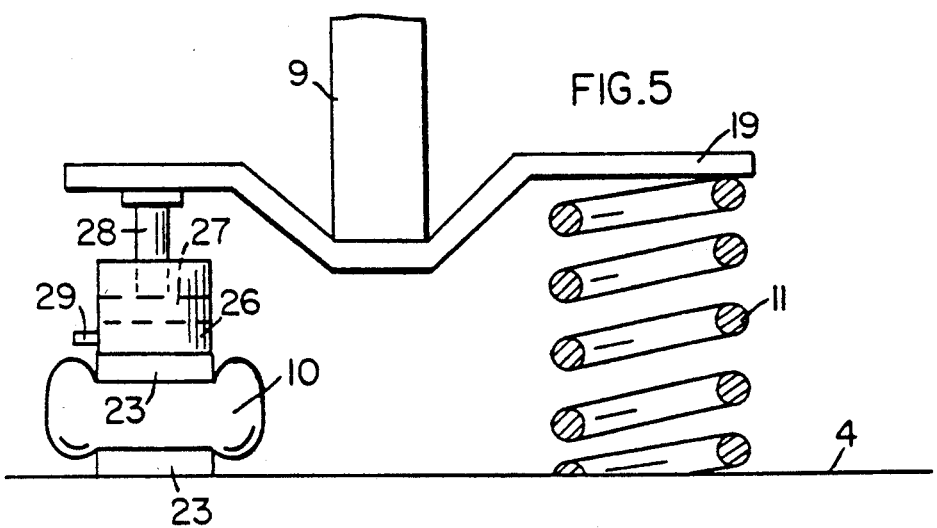
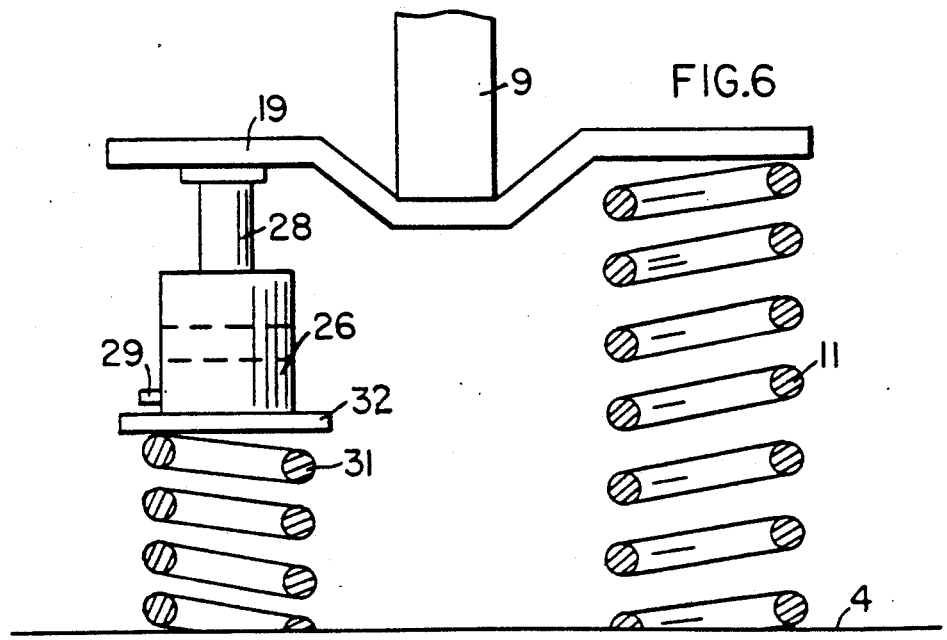

APPARATUS FOR ISOLATING LOOM VIBRATIONS AND CONTINUOUSLY ADJUSTING ITS LEVEL

The invention relates to an apparatus for isolating vibrations of a loom, including a loom leveling device especially suitable for so-called Jacquard looms.

BACKGROUND INFORMATION

U. S. Pat. No. 4,664,156 (Breyer) corresponding to German Utility Model No.: 85/02552 discloses a device for isolating vibrations of heavy equipment, especially a loom for preventing loom vibrations from entering into the supporting floor. The known device includes spring packages in combination with a hydraulic damper for supporting the machine legs on a machine floor. The known device of U.S. Pat. No. 4,664,156 is not quite suitable for supporting a loom equipped for cooperation with a Jacquard mechanism arranged above the loom in a fixed position. Such a loom and Jacquard combination requires a continuous readjustment of the loom level during the weaving operation. The known device is not suitable for such a level adjustment and control.

European Patent Publication 0,139,773 Al discloses a vibration isolating mechanism for looms which includes a so-called air spring. The known air spring is so constructed that it assures an especially soft mounting of the loom on one side thereof. Such a mechanism can be used for so-called Jacquard looms. However, there is still a drawback since the apparatus of European Patent Publication EP 0,139,773 does not provide a sufficient vibration isolating effect, especially for Jacquard looms.

In connection with a loom mounted for cooperation with a Jacquard mechanism arranged above the loom, special vibration damping problems occur, because the weight of the loom does not remain constant throughout a weaving operation. Assuming the total weight of the loom includes the weight of the wrap beam and the weight of the fabric take-up roller, the total weight is smallest; at the beginning of a weaving operation when the warp beam is completely wound with warp thread and wett threads have not yet entered into the fabric. As the weaving progresses, the weight of the warp beam is continuously being reduced by the withdrawal of warp thread but the fabric take-up roller becomes heavier by the accumulation of fabric on the fabric take-up roller. Further, the front or take-up roller for the fabric is exchanged several times during a weaving operation, so that during the course of a weaving operation the total weight of the loom first becomes heavier and then lighter when a full fabric take-up roller is replaced by an empty take-up roller.

The just described weight change of the weaving loom has the disadvantage in connection with a loom cooperating with a stationarily mounted Jacquard mechanism, that the changing mounting weight effective on the vibration dampers, changes the spacing between the loom and the mounting surface of the machine floor and thus also the spacing between the loom and the Jacquard mechanism so that the spacing to the harness threads of the Jacquard mechanism is reduced as the machine weight is decreasing, whereby the effective harness thread length is shortened. As a result, the formation of the loom shed was adversely affected by the shortened harness threads. On the other hand, if the loom became heavier due to the fabric take-up roller becoming full the harness threads became longer again thereby making it difficult to assure a uniform shed formation. OBJECTS OF THE INVENTION , In view of the foregoing it is the aim of the invention to achieve the following objects singly or in combination:

to provide an apparatus for isolating vibrations of a loom cooperating with a Jacquard mechanism in such a way that the adverse effects on the shed formation by varying machine weights are avoided;

to make sure that the spacing between the loom and the Jacquard remains constant independently of loom weight changes and independently of any shifting of the center of gravity of the loom; and to improve the quality of the weave made on a loom Jacquard combination.

SUMMARY OF THE INVENTION

An apparatus for isolating vibrations of a loom is characterized according to the invention in that the loom is mounted on at least one vibration damper including means for controlling and adjusting the level of the loom relative to the mounting surface, such as a factory floor, for maintaining a constant spacing between the loom and a Jacquard mechanism mounted above the loom. The apparatus according to the invention achieves a completely new effect because, depending on a weight change of the loom, which is effective on one or several level controllable vibration dampers, the spacing between the loom and the Jacquard mechanism arranged above the loom, can now be kept constant by a continuous adjustment of the damping mechanism or rather its damping characteristic. This feature makes sure that the loom shed formation is always exposed to the same operating condition and thus always the same loom shed is formed, resulting in a uniform weave and constant fabric quality.

According to an especially preferred embodiment of the invention two level controllable or adjustable vibration dampers are arranged in parallel to one another below the loom in a vertical plane passing through the center of gravity of the warp beam. This arrangement has the advantage that the effects of a changing warp beam weight are optimally compensated. Such an optimal compensation is possible because the level control means of the vibration dampers are directly responsive to changes in the warp beam weight and such responsiveness is effective in the control of the vibration dampers so that the supporting height of the vibration dampers is adjusted in accordance with the weight of the warp beam without any need for also adjusting the mounting height or level of the other vibration dampers supporting the loom.

According to another embodiment of the invention the level controllable vibration dampers are arranged, so that even if the center of gravity of the entire loom, should shift a plurality of level controllable vibration dampers can perform the mounting and support functions as well as the level control function simultaneously to keep the mentioned spacing constant. Constructing all vibration dampers of a loom to be level adjustable, may be somewhat more expensive, but justified for certain types of looms, especially for producing high quality fabrics.

It is to be understood that the mentioned arrangement of the vibration dampers, so that the center of gravity is taken as a reference point for the location of the vibration dampers, may be accomplished in a practical embodiment by placing one level adjustable vibration damper between each corner, or rather leg, of the loom and the supporting floor so that each of the four corners would be supported in an adjustable manner for compensating any variations of the loom or shifts in the position of the center of gravity of the loom caused by weight changes of the loom as the weaving progresses.

According to a preferred embodiment of the invention the level controllable vibration dampers are equipped with so-called air springs which are especially simple in their practical application and easy to control in their damping response characteristic by means of a pneumatic control valve. A sensor member is arranged, for example, to continuously sense the spacing of a fixed point on the loom relative to the floor surface. This sensor controls the control valve in response to a change in the sensed spacing, so that pressurized air may be supplied to the air springs or removed from the air springs as required. In such an embodiment it is preferred that the machine weight is taken up by steel springs arranged in parallel to the pneumatic air springs, so that the air springs themselves perform the level control or regulation in response to the changing weight of the warp beam while the steel springs take up the load. Additionally, the air springs contribute to the vibration damping due to the compressibility of the air.

In another embodiment of the invention, the level controllable elements are constructed as hydraulic elements, for example, in the form of a piston cylinder device having a cylinder and a piston that is adjustable in its position inside said cylinder in response to the desired level control. Such a hydraulic cylinder could either be effective on a further air cushion or air spring, or it could be combined with an additional spring to achieve a vibration damping or isolation.

According to another preferred embodiment of the invention, a sensor is provided for sensing the spacing of the lower machine frame of the loom relative to the mounting surface, such as the machine floor, and the respective signal is used as the actual signal for the level control.

According to an other embodiment of the present invention, the spacing between the upper loom frame or an upper reference point of the loom and the Jacquard mechanism arranged above the loom, is sensed for the level control.

The vibration isolation mechanism according to the invention is constructed to have a relatively soft vibration damping characteristic, whereby a highly effective vibration isolation is achieved. Such a soft vibration damping characteristic is quite superior compared to the known vibration damping devices having a hard damping characteristic which are arranged below the warp beam. Heretofore, it was common practice to use hard vibration dampers below the warp beam in order to compensate for varying warp beam weights. However, such vibration dampers having a hard vibration characteristic are unsatisfactory for maintaining a constant spacing between the Jacquard mechanism and the loom independently of the changing weight of the warp beam. In fact, the damping effect of so-called hard dampers becomes rapidly worse as the supported weight is being reduced.

BRIEF FIGURE DESCRIPTION

In order that the invention may be clearly understood, it will now be described, by way of example, with reference to the accompanying drawings, wherein:

FIG. 4 is a view similar to the lift-hand side of FIG. 2, but with the air spring of FIG. 2 replaced by a controllable piston cylinder device;

FIG. 5 is a view similar to that of FIG. 4 with the piston cylinder device arranged in series with the air spring; and FIG. 6 is a view similar to that of FIG. 4, with the piston cylinder device arranged in series with a further spring.

DETAILED DESCRIPTION OF PREFERRED EXAMPLE EMBODIMENTS AND OF THE BEST MODE OF THE INVENTION

Figure 1:
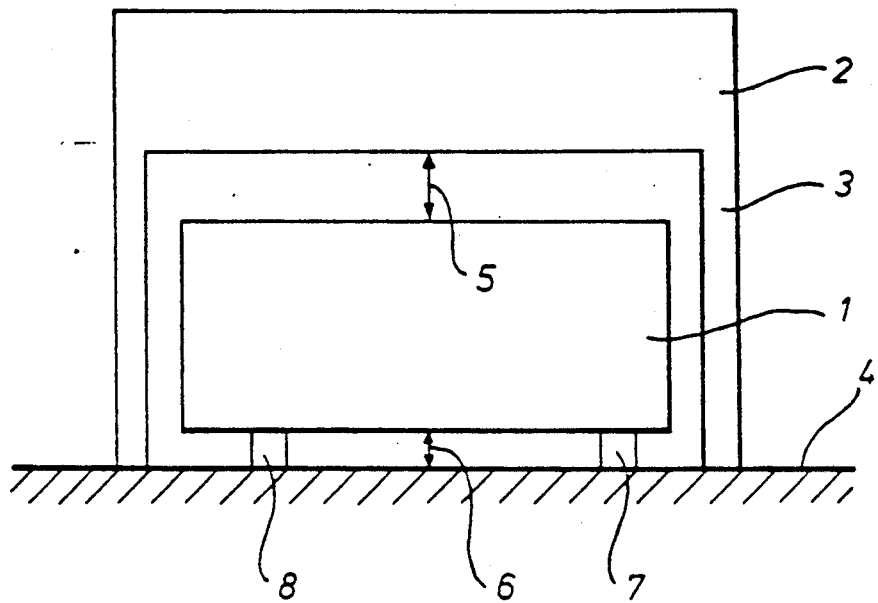
FIG. 1 is a schematic illustration of a weaving loom combined with a Jacquard mechanism arranged in a stationary position above the loom.

FIG. 1 shows a loom 1 mounted on a floor 4 by means of support elements 7 and 8 forming level controllable vibration dampers capable of changing the spacing 6 between the loom 1 and the plane defined by the support floor 4. A Jacquard mechanism 2 is mounted on the floor in a stationary position by means of frame members 3 for holding the Jacquard mechanism 2 at a spacing 5 above the loom 1. According to the invention the spacing 5 between the Jacquard mechanism 2 and the loom shall be maintained constant independently of any changes in the weight of the loom 1 while simultaneously dampening vibrations of the loom 1 so that a vibration isolation is provided between the loom 1 and the floor 4.

According to the shown embodiment the constant spacing 5 is achieved by keeping the spacing 6 constant by means of support devices forming level controllable vibration dampers 7 and 8.

Figure 2:
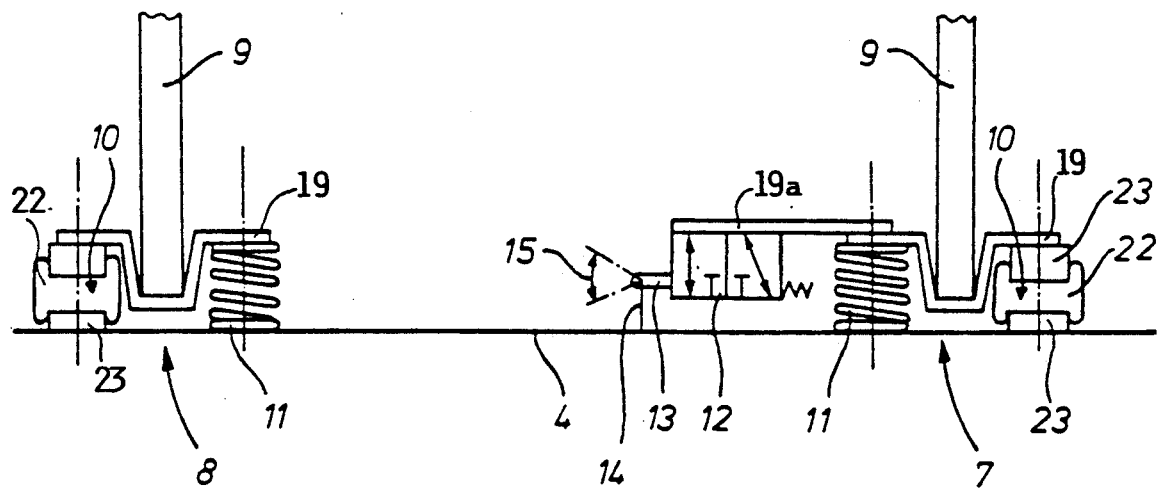
FIG. 2 is a schematic side view of one side of the loom illustrating the present vibration damping apparatus.
Figure 3:
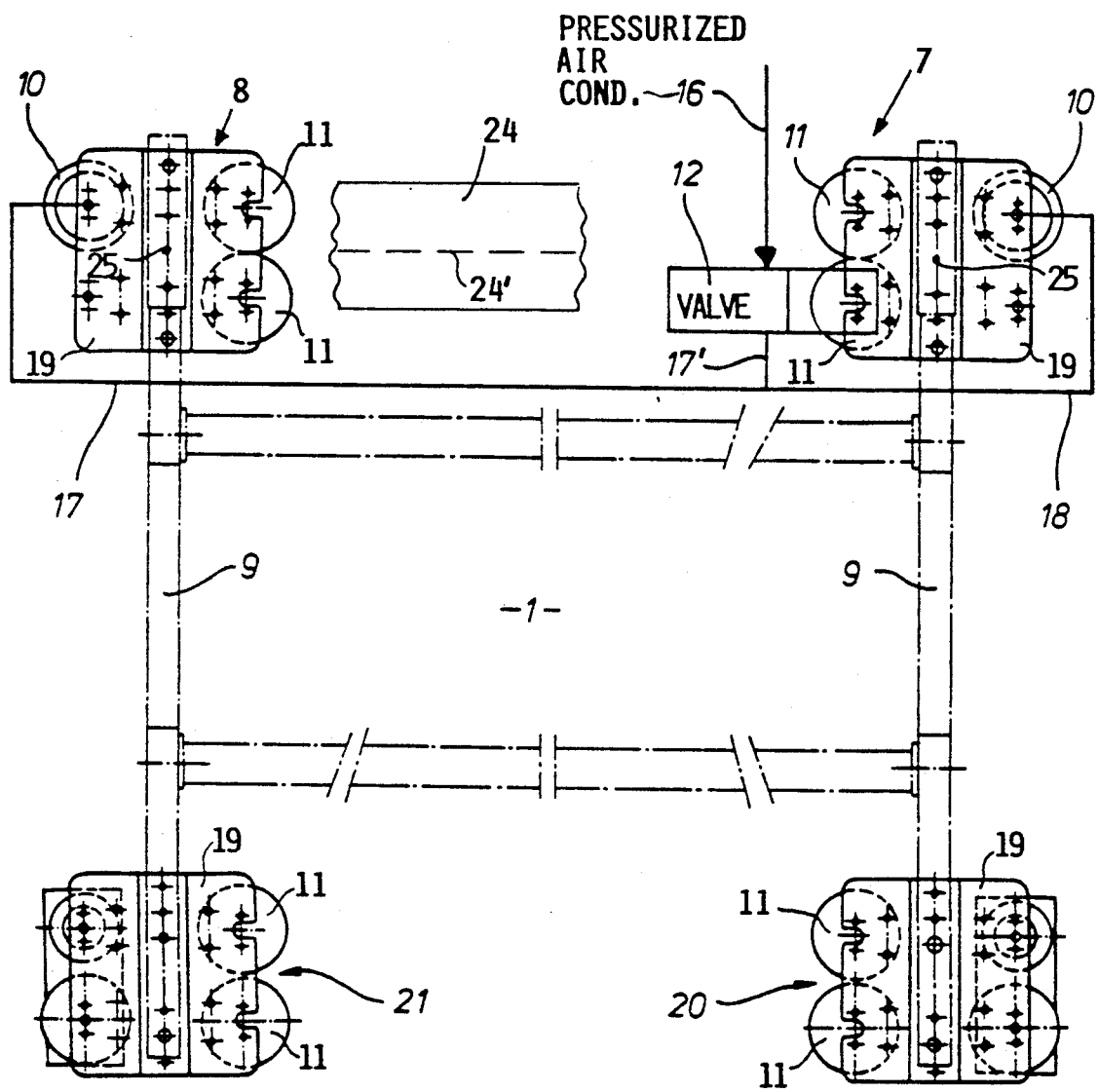
FIG. 3 is a top plan view of the support apparatus for the machine frame of a loom relative to the supporting surface plane, such as a machine floor, whereby each corner of the loom frame is supported.

FIGS. 2 and 3 show a possible structural embodiment. The machine frame members 9 of the loom are supported by four support devices 7, 8, 20, and 21 on the floor 4. The support vibration damper devices 7 and 8 are constructed to be level controllable while the support devices 20 and 21 are constructed to comprise steel springs which are not level controllable.

According to another embodiment of the invention it is possible to construct all four support devices 7, 8, 20, and 21 to be level controllable. For simplicity's sake, it is however, sufficient to arrange the level controllable support devices 7 and 8 in a vertical plane passing through the center of gravity of a warp beam 24 on the machine frame 9 of the loom 1 and to construct the other support devices 20, 21 so that they are not level controllable. The warp beam 24 is not part of the invention and hence only shown symbolically in FIG. 3. The axis 24' of the warp beam 24 is arranged symmetrically relative to centers 25 of the support devices 7 and 8 or in alignment with these centers 25.

Each adjustable or controllable support device 7 and 8 comprises a package of steel springs 11 arranged below a common mounting plate 19. An air spring 10 is also arranged below the mounting plate 19 shown in FIGS. 2 and 3. Each air spring 10 comprises a central compressible section 22 of an elastic material, for example, fiber reinforced rubber or the like which is filled with air.

As shown in FIG. 2 this central compressible section 22 of the air spring 10 is enclosed by upper and lower members 23 made of synthetic material of sufficient strength for this purpose. The members 23 may be made, for example, of steel or compound materials containing steel or any other noncompressible material. The members 23 bear against the central compressible section 22.

By introducing air under pressure into the central compressible section 22, it is possible to maintain the spacing 6 constant even if the weight of the loom 1 should be changing, since by varying the air pressure in the central section 22, it is possible to vary the supporting force.

For controlling the air pressure, the central section 22 is connected to a compressed air conduit 16 shown in FIG. 3 through a control valve 12, preferably of the three/two way type. The valve 12 is secured to a support plate 19a and comprises a control lever 13 shown in FIG. 2 which is equipped with a sensor pin 14 reaching to the floor 4. Thus, the sensor pin 14 can respond to changes in the spacing 6 to thereby operate the lever 13. If desired, a weight may press the lever 13 downwardly to assure the continuous engagement of the sensor pin 14 with the floor.

The control lever 13 is thus adjustable within an angular range 15 in direct response to the changes in the spacing 6 relative to the floor 4. For example, when the warp beam 24 becomes lighter the loom center of gravity will shift in the course of the weaving operation, whereby the lever 13 will tilt in the counterclockwise direction toward the floor 4, thereby releasing compressed air from the central section 22 of the air spring 10, so that the desired spacing 6 between the loom 1 and the floor 4 is maintained constant. This type of sensing is rather very sensitive and hence also assures a precise, constant spacing 5 between the loom 1 and the Jacquard machine 2.

As shown in FIG. 3, the two air cushions or air springs 10 in the devices 7 and 8 are connected in parallel to one another by conduits 17 and 18. A branch conduit 17' connects the conduits 17, 18 to the valve 12. Thus, the two leveling devices 7 and 8 are operated in unison for controlling the level of the entire loom. The compressed air at the outlet port of the three/two way valve 12 is fed through the compressed air branch conduit 17' into the connecting conduits 17 and 18. Incidentally, the above described control is a closed loop control.

FIG. 4 shows a support 8a forming a controllable vibration damper with a spring 11 and with a hydraulic piston cylinder device having a cylinder 26 and a piston 27 with a piston rod 28 engaging the mounting plate 19. A connector 29 is connected through a pressure hose to a source of controllable hydraulic pressure. The hydraulic fluid can be moved into and out of the lower cylinder chamber of the cylinder 26 as indicated by the double arrow 30, whereby the piston 27 with its rod 28 is adjustable in its position in accordance with or as a function of the desired level control.

In FIG. 5 the hydraulic piston cylinder device 26, 27, 28 rests on an air spring 10, so that the piston cylinder device and the air spring are arranged in series between the floor 4 and the mounting plate 19.

In FIG. 6 an additional spring 31 is located between the floor 4 and a bottom plate 32 of the piston cylinder device 26, 27, 28, so that the latter rests on the spring 31 which is provided in addition to the spring 11. The spring 31 and the piston cylinder device are also arranged in series with each other.

Although the invention has been described with reference to specific example embodiments, it will be appreciated, that it is intended to cover all modifications and equivalents within the scope of the appended claims.

What I claim is:

1. An apparatus for isolating vibrations of a loom combined with a Jacquard machine, comprising a loom including machine frame means for supporting said loom, a Jacquard machine including a Jacquard frame for supporting said Jacquard machine relative to said loom, at least four vibration damper means for supporting said loom relative to a supporting floor plane in a loom position permitting cooperation of said loom with said Jacquard machine, said vibration dampers comprising spring means in combination with pressure adjustable damping means, said pressure adjustable damping means forming at least one level controllable vibration damper for maintaining a substantially constant spacing (5) between said Jacquard machine (2) and said loom (1) in response to weight changes of said loom (1).

2. The apparatus of claim 1, comprising at least two level controllable vibration dampers arranged and connected in parallel to one another, said at least two vibration dampers being arranged below said loom (1) in a vertical plane passing through a center of gravity of a warp beam forming part of said loom.

3. The apparatus of claim 1, comprising a plurality of controllable vibration dampers arranged in such positions between said loom and said floor that said substantially constant spacing is maintained even if a center of gravity of the entire loom should shift.

4. The apparatus of claim 1, wherein said level controllable vibration dampers are constructed as air springs (22) connected to pneumatic control valve means (12), said apparatus further comprising sensor means (13, 14) extending from said control valve means (12) for sensing a further spacing (6) between said loom (1) and said floor (4), for controlling said valve means (12) in response to changes in said further spacing (6).

5. The apparatus of claim 1, wherein said spring means comprise steel springs (11) for taking up a machine weight, and wherein said vibration damper comprises air springs (22) arranged in parallel to said steel springs (11), whereby said air springs (22) themselves are provided for the vibration isolation and for the level control in response to the varying loom weights including varying warp beam weights.

6. The apparatus of claim 1, wherein said level controllable vibration damper is constructed as a hydraulic device including a cylinder and a piston in said cylinder, said piston being adjustable in its position in said cylinder as a function of the desired level control.

7. The apparatus of claim 6, further comprising an air spring, and wherein said hydraulic piston and cylinder are arranged to rest on said air spring.

8. The apparatus of claim 6, further comprising an additional spring, and wherein said hydraulic piston and said cylinder rest on said additional spring.

* * * * *

UNITED STATES PATENT AND TRADEMARK OFFICE
CERTIFICATE OF CORRECTION

PATENT NO. : 5,038,835
DATED : August 13, 1991
INVENTOR(S) : Werner Breyer

It is certified that error appears in the above-identified patent and that said Letters Patent is hereby corrected as shown below:

Title Page:

In the Abstract [57], line 6, replace "wrap" by --warp--;

Column 2, line 2, delete "OBJECTS OF THE INVENTION,";

column 2, above line 3 insert as a separate subheading: --OBJECTS OF THE INVENTION--.

Signed and Sealed this

Eighth Day of December, 1992

Attest:

DOUGLAS B. COMER

Attesting Officer

Acting Commissioner of Patents and Trademarks